United States Patent [19]
Sakaue et al.

[11] Patent Number: 6,154,569
[45] Date of Patent: *Nov. 28, 2000

[54] SYSTEM AND METHOD FOR CODING AND/OR DECODING IMAGE INCLUDING BIT-MAP OF DIFFERENT LEVELS

[75] Inventors: Eiichi Sakaue; Sunao Tabata, both of Yokohama; Naofumi Yamamoto, Inagi; Hidekazu Sekizawa, Yokohama, all of Japan

[73] Assignee: Kabushiki Kaisha Toshiba, Kanagawa-ken, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/616,722

[22] Filed: Mar. 15, 1996

[30] Foreign Application Priority Data

Mar. 16, 1995 [JP] Japan ................................. 7-057036

[51] Int. Cl.$^7$ ....................................................... G06K 9/36
[52] U.S. Cl. ........................................... 382/233; 358/433
[58] Field of Search ................................ 341/50, 51, 55, 341/99; 382/233, 239, 257, 176; 358/426, 433, 429, 443, 532, 539

[56] References Cited

U.S. PATENT DOCUMENTS

| | | | |
|---|---|---|---|
| 5,010,345 | 4/1991 | Nagy | 341/51 |
| 5,317,417 | 5/1994 | Yamamura et al. | 358/429 |
| 5,361,147 | 11/1994 | Katayama et al. | 358/532 |
| 5,363,219 | 11/1994 | Yoshida | 358/539 |
| 5,416,603 | 5/1995 | Suzuki | 358/426 |
| 5,694,125 | 12/1997 | Owsley et al. | 341/50 |
| 5,696,842 | 12/1997 | Shirasawa et al. | 382/176 |
| 5,724,441 | 3/1998 | Yoshida | 358/539 |

FOREIGN PATENT DOCUMENTS

| | | |
|---|---|---|
| 6-40661 | 5/1994 | Japan . |
| 6-40661 | 6/1994 | Japan . |

OTHER PUBLICATIONS

Oka et al, "Image Coding Schemes for Hard Copiers", Journal of Japan Society of Printing, vol. 27, No. 3, pp. 290–298, 1990.

Primary Examiner—Amelia Au
Assistant Examiner—Samir Ahmed
Attorney, Agent, or Firm—Foley & Lardner

[57] ABSTRACT

A coding and/or decoding system for an image including bit-sops of different levels, is provided in an image recoding system which recodes bit-map data including small-level bit-map data and multilevel bit-map data in an image memory and which read the bit-map data out of the image memory to recode an image. In this coding and/or decoding system, after small-level bit-map data and multilevel bit-map data are divided into blocks, each of which is composed of a plurality of picture elements, the divided small-level bit-map data and the divided multilevel bit-map data are inputted to small-level bit-map data coding section and multilevel bit-map data coding section, respectively. The small-level bit-map data are transformed into codes representative of the number of black or white and half-tone picture elements in the block, and the multilevel bit-map data are transformed into codes representative of the average value or the total in the block. These data are assigned to different codes of digital data written in the image memory, respectively, so as to provide an image recoding system which can effectively reduce the capacity of a page memory for storing an image information and which can recode an image including small-level and multilevel.

3 Claims, 19 Drawing Sheets

SUROUNDING BLOCK
BLOCK TO BE NOTICED (BLACK PIXELS)
SUROUNDING BLOCK
(THERE ARE BLACK PIXELS)

FIG. 12(b)

RIGHT BLOCK IS MULTILEVEL BLOCK AND TONE 0

RIGHT BLOCK IS MULTILEVEL BLOCK AND TONE 1

RIGHT BLOCK IS MULTILEVEL BLOCK AND TONE 13

RIGHT BLOCK IS BINARY BLOCK AND THE NUMBER OF BLACK PIXEL IN THE BLOCK IS 1

RIGHT BLOCK IS BINARY BLOCK AND THE NUMBER OF BLACK PIXEL IN THE BLOCK IS 2

RIGHT BLOCK IS BINARY BLOCK AND THE NUMBER OF BLACK PIXEL IN THE BLOCK IS 7

- 0: LEFT BLOCK IS MULTILEVEL BLOCK AND TONE 0
- 1: LEFT BLOCK IS MULTILEVEL BLOCK AND TONE 1
- 13: LEFT BLOCK IS MULTILEVEL BLOCK AND TONE 13
- 14: LEFT BLOCK IS MULTILEVEL BLOCK AND TONE 0
- 15: LEFT BLOCK IS MULTILEVEL BLOCK AND TONE 1
- 27: LEFT BLOCK IS MULTILEVEL BLOCK AND TONE 13
- 182: LEFT BLOCK IS MULTILEVEL BLOCK AND TONE 0
- 183: LEFT BLOCK IS MULTILEVEL BLOCK AND TONE 1
- 195: LEFT BLOCK IS MULTILEVEL BLOCK AND TONE 13
- 196: LEFT BLOCK IS BINARY BLOCK AND THE NUMBER OF THE BLACK PIXEL IS 1
- 197: LEFT BLOCK IS BINARY BLOCK AND THE NUMBER OF THE BLACK PIXEL IS 2
- 202: LEFT BLOCK IS BINARY BLOCK AND THE NUMBER OF THE BLACK PIXEL IS 7
- 203: LEFT BLOCK IS BINARY BLOCK AND THE NUMBER OF THE BLACK PIXEL IS 1
- 204: LEFT BLOCK IS BINARY BLOCK AND THE NUMBER OF THE BLACK PIXEL IS 2
- 209: LEFT BLOCK IS BINARY BLOCK AND THE NUMBER OF THE BLACK PIXEL IS 7
- 238: LEFT BLOCK IS BINARY BLOCK AND THE NUMBER OF THE BLACK PIXEL IS 1
- 239: LEFT BLOCK IS BINARY BLOCK AND THE NUMBER OF THE BLACK PIXEL IS 2
- 244: LEFT BLOCK IS BINARY BLOCK AND THE NUMBER OF THE BLACK PIXEL IS 7
- 245: ERROR CODING CODE

FIG. 13

| | RIGHT BLOCK IS MULTILEVEL BLOCK AND TONE 0 | RIGHT BLOCK IS MULTILEVEL BLOCK AND TONE 1 | ... | RIGHT BLOCK IS MULTILEVEL BLOCK AND TONE 13 | RIGHT BLOCK IS BINARY BLOCK AND THE NUMBER OF BLACK PIXEL IN THE BLOCK IS 1 | RIGHT BLOCK IS BINARY BLOCK AND THE NUMBER OF BLACK PIXEL IN THE BLOCK IS 2 | ... | RIGHT BLOCK IS BINARY BLOCK AND THE NUMBER OF BLACK PIXEL IN THE BLOCK IS 7 |
|---|---|---|---|---|---|---|---|---|
| LEFT BLOCK IS MULTILEVEL BLOCK AND TONE 0 | 0 | 1 | ~ | 13 | 196 | 197 | ~ | 202 |
| LEFT BLOCK IS MULTILEVEL BLOCK AND TONE 1 | 14 | 15 | ~ | 27 | 203: AND ERROR CODING | 204 | 205 | 210 |
| ... | ... | ... | | ... | ... | ... | | ... |
| LEFT BLOCK IS MULTILEVEL BLOCK AND TONE 13 | 182 | 183 | ~ | 195 | 211: AND ERROR CODING | 252 | 253 | 258 |
| LEFT BLOCK IS BINARY BLOCK AND THE NUMBER OF BLACK PIXEL IS 1 | | | | | | | | 259: AND ERROR CODING |
| LEFT BLOCK IS BINARY BLOCK AND THE NUMBER OF BLACK PIXEL IS 2 | | | | | | | | |
| LEFT BLOCK IS BINARY BLOCK AND THE NUMBER OF BLACK PIXEL IS 7 | | | | | | | | |

FIG. 16

| PATTERN No | 4-PIXEL BLOCK ELEMENTS | PATTERN No | 4-PIXEL BLOCK ELEMENTS |
|---|---|---|---|
| 0 | 0,0,0,0 | 8 | 0,1,2,2 |
| 1 | 0,0,0,1 | 9 | 0,2,2,2 |
| 2 | 0,0,0,2 | 10 | 1,1,1,1 |
| 3 | 0,0,1,1 | 11 | 1,1,1,2 |
| 4 | 0,0,1,2 | 12 | 1,1,2,2 |
| 5 | 0,0,2,2 | 13 | 1,2,2,2 |
| 6 | 0,1,1,1 | 14 | 2,2,2,2 |
| 7 | 0,1,1,2 | | |

WHITE PIXEL IS DEFINED BY .0   BLACK PIXEL IS DEFINED BY .2   HALF-TONE PIXEL IS DEFINED BY .1

FIG. 17

```
1 BLOCK    5-BIT DATA     (32 LEVELS)

0   1   2   3  ......17   18   19   20   ......29   30   31    ERROR
                                                                        CODE
         HIGH-TONE
         BLOCK
         DATA
         (18 LEVELS) PATTERN =      =      =      =        =      =

PATTERN  No   No   No   No                              No     No
No       14    1    2    3                              12     13
0
                            HIGH-RESOLUTION
                            BLOCK DATA
```

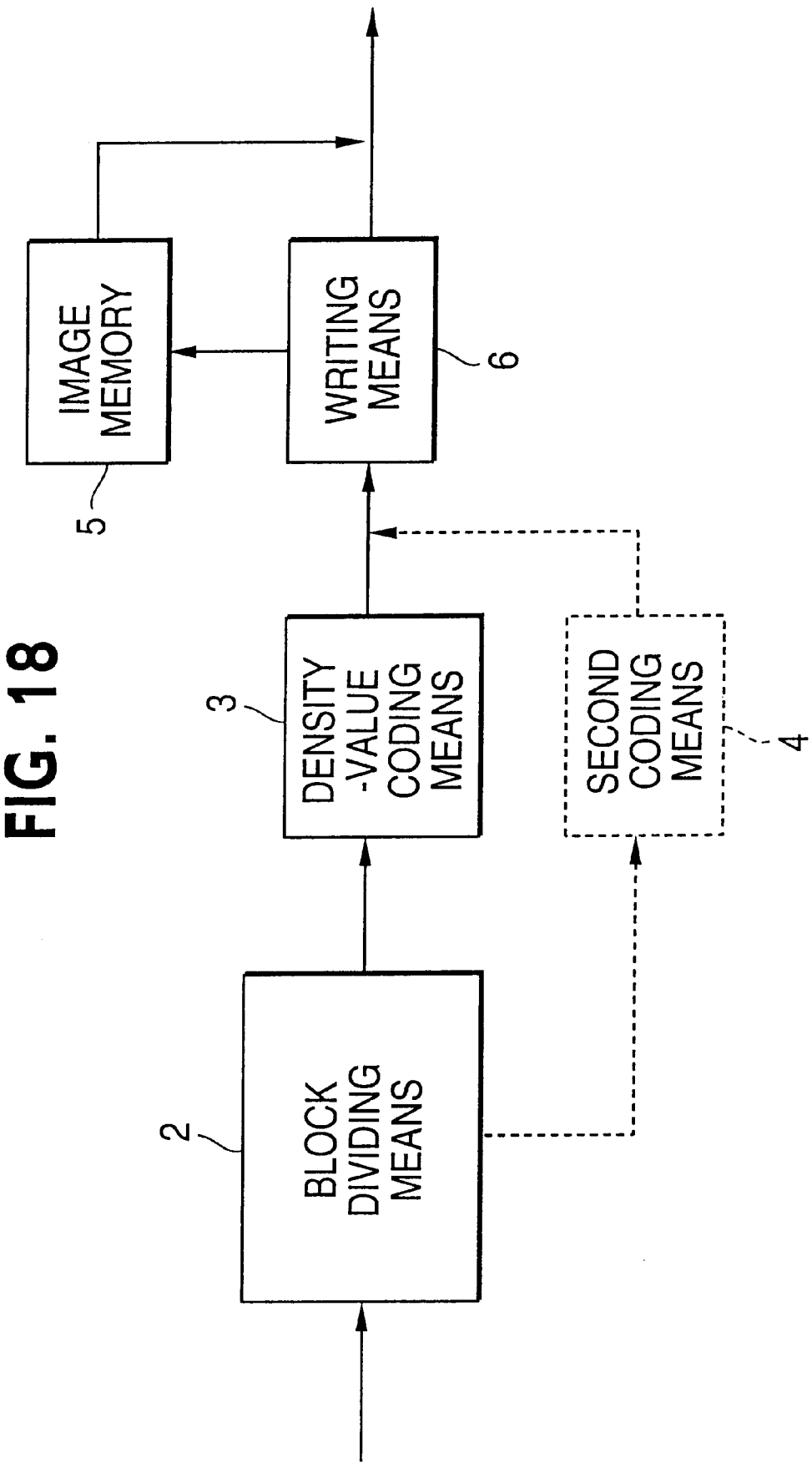

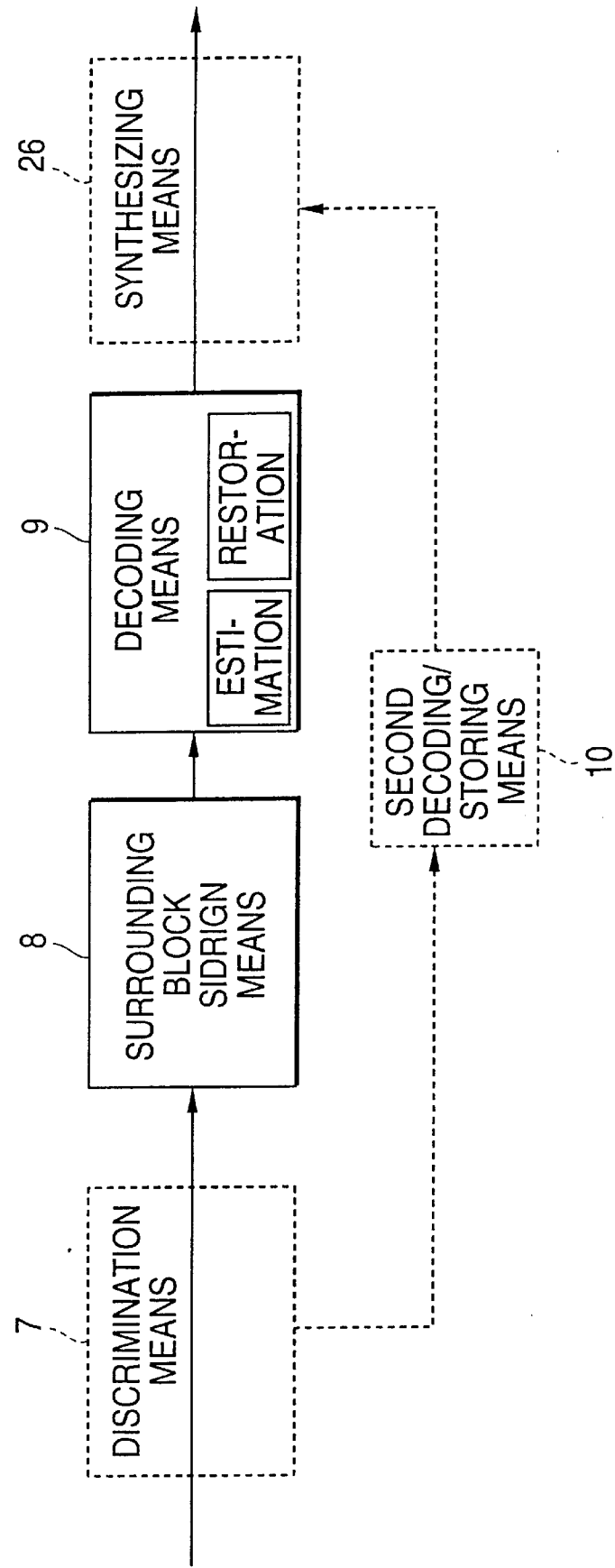

SYSTEM AND METHOD FOR CODING AND/OR DECODING IMAGE INCLUDING BIT-MAP OF DIFFERENT LEVELS

BACKGROUND OF THE INVENTION

The present invention relates generally to a system and method for coding and/or decoding an image including a bit-map of different levels. More specifically, the invention relates to an image coding and/or decoding system and method which discriminates as to whether the digital value of a block configuring an image data is a small-level, or a multilevel containing 256-tones, for coding the block in accordance with its digital value, and which decodes the coded image including a bit-map of different levels for reproduction, display, and so forth. Throughout the specification, "small bit-map data" refers a binary, a three-level, four-level and six-level with respect to bit-map data.

The small bit-map data of binaries or four-levels are bit-map data regarding resolution to be more important than tone, and the multilevel bit-map data are bit-map data regarding tone to be more important than resolution.

As desktop publishing (DTP) has been developed, it has been easy to add a natural image such as a photograph to a document, and there have been great opportunities for recording a natural image. Therefore, it is expected to develop an image recording system such as a printer for printing and recording an image which includes a character Image and a natural image. The digital values of a natural image often have multilevel data of multitone, not binary data for white and black such am a character image.

In an image recording system such as most of conventional printers and digital copying machines, the aforementioned binary data is recorded by the pseudo half-tone recording method. In this method, a pseudo half-tons is expressed in accordance with the ratio of white picture elements to black picture elements in a certain small region (block) The reason why this pseudo half-tone recording method is proposed is that conventional image recording systems are suitable for a binary recording which records an image in accordance with the presence of a bit, and that they are unsuitable for a multilevel recording which expresses the density of multilevel by individual dots. However, in a recent image recording system such as a laser printer, it is possible to carry out the multilevel recording by the pulse-width modulation and the intensity modulation in a picture elemnt, since the processing speed of a controller increases as the performance of a laser drive or a CPU increases.

In a picture image recording system such as a printer, it is designed that the image data to be recorded are temporarily stored in an image memory such as a page memory, and that the stored image date are read out to be supplied for recording. In a multilevel data recording system, it is necessary for a page memory to have large capacity since data for one picture element are multilevel data. That is, the capacity of the memory per one picture element must be the bit-number times as large as the capacity of a page mammary for a binary data recording system wherein 1-bit information is stored as the data for one picture element. As a result, there is a problem in that the manufacturing cost of the whole recording system is increased.

Therefore, the technique for compressing the data of large capacity of the different-levels bit-map data using the compression technique to write the reduced measure of information in a memory of limited capacity, has been proposed. As a general method for this technique, there is a method for recording binary data as they are, and for compressing only multilevel data to write them in a memory. For example, in Japanese Patent Laid-Open No. 6-40661, when image data are written every block composed of a plurality of picture elements, it is discriminated as to whether the data in each of the blocks are binary data or multilevel data. Then, the binary data are stored in a memory without the need of compression, and the multilevel data are compressed up to substantially the same measure of information as that of binary data in accordance with the average value of data of the picture elements in the block, so that the capacity of a page memory necessary for storing the data can be saved.

In addition, as the prior art used for a conventional system for recording an image including a bit-map of different levels, a fixed-length compression technique for compressing image data into a fixed-length code having a predetermined bit-number is proposed in "Image Compression Suitable For Hard Copy System" (written by Oka, Aniin and Nakajima, Journal of Japan Society of Printing, Vol. 27, No. 3, pp. 290–298, 1990).

In this compression method, an original image of picture elements, each of which is a 8-bit picture element, is blocked into a plurality of blocks, each being composed of 4×4 picture elements. Then, each of the blocks is divided so that the difference between the maximum value and the minimum value in the 16 picture elements in each of the blocks is 2 bits. That is, each of the blocks is divided into four levels including the maximum value and the minimum value so that the value of each of the 16 picture elements is approximated by the four levels. The code amount of each of the block is 32 bits since "2 (bits)×16 (picture elements)". In addition, 8 bits are assigned to each of the maximum value and the minimum value, and are added to 32 bits of the coded image. The 48 bits thus totaled are compressed and coded to be used as image data for each of the blocks.

According to the aforementioned conventional system for recording an image including a bit-map of different values, it is possible to compress the measure of information of multilevel data up to the same measure as that of binary data by means of blocking. However, since it is discriminated as to whether the date configuring the respective blocks are binary data or multilevel data, there is a disadvantage in that discriminating data of 1 bit must be newly written in a memory as additional data. Therefore, it is required to provide a memory of capacity at least two time as large an the capacity of a page memory for storing multilevel data. Considering an aspect of cost, it is desired to reduce the capacity of a page memory for storing multilevel data up to the same measure as the capacity of a page memory for storing binary data.

In addition, according to the aforementioned system of the fixed-length compression to which a compression method using 4-level digital values in each block is applied, the amount for compressed data is 48 bits per 16 picture elements, i.e. 3 bits per a picture element. Therefore, although there is an advantage in that the coding can be carried out using a fixed-length code, there is a disadvantage in that the amount of compressed data is greater then that in the variable-length coding method such as a method by Telecommunication Standardization Department of International Telecommunication Union (Joint Photographic coding Experts Group (JPEG)).

SUMMARY OF THE INVENTION

It is therefore a principal object of the present invention to provide a system and method for coding and/or decoding a image including a bit-map of different levels, the system and method being able to efficiently compress multilevel bit-map data regarding tone as important, by coding the image data including bit-map date of different digital values, such as binary, 4-level and multilevel, as a common code, for coding and/or decoding the image so that the multilevel bit-map data can be discriminated from small bit-map data regarding resolution as important.

In order to accomplish the aforementioned and other objects, according to one aspect of the present invention, there is provided a system for coding an image including a bit-map of different levels for expressing a plurality of picture elements by different-level bit-map data which includes small bit-map data regarding resolution as important and of multilevel bit-map data regarding tone as important, and for storing and/or transmitting the different-level bit-map data. This system comprises: a discrimination means for inputting a different-level bit-map data including image to be stored and/or transmitted and for sequentially discriminating the values of bit-map data of each of a plurality of blocks, each of which configures the image and is composed of a plurality of picture elements; a plurality of block dividing means, each of which divides the image into a plurality of blocks in accordance with the values of bit-map data of the respective blocks, the plurality of block dividing means being provided for at least binary bit-map data and multilevel bit-map data; a first coding means for transforming image data which configure a plurality of blocks divided by the block dividing means for the small bit-map data, into codes representative of the numbers of black picture elements, white picture elements and gray scale picture elements in the blocks, and for assigning the codes to a first code-row of the common codes of digital data of predetermined bit-number; a second coding means for transforming image data which configure a plurality of blocks divided by the block dividing means for the multilevel bit-map data, into codes representative of predetermined parameters, and for assigning the codes to a second code-row of the common codes of the digital data; and a writing means for writing the same digital data in an image memory, the same digital data being assigned to the first and second code in accordance to the binary and multilevel.

According to another aspect of the present invention, there is provided a decoding system for an image of a bit-map of different levels. This decoding system decodes image data which have been coded by a coding system for coding an image of a bit-map of different levels which expresses a plurality of picture elements by different-level bit-map data including small bit-map data regarding resolution as important and multilevel bit-map data regarding tone as important, and for storing and/or transmitting the different-level bit-map data. This decoding system comprises: a discrimination means for inputting the common codes of different-level bit-map data and for discriminating as to whether the common codes are included in a code-row representative of small bit-map data regarding resolution as important or another code-row representative of multilevel bit-map data regarding tone as important; a first storage means for storing small bit-map data when the discrimination means discriminates that the common codes are the small bit-map data; a first decoding means for estimating that the image data stored in the first storage means are bit-map data regarding resolution as important and for restoring the assigned code to small bit-map data; a second decoding means for reversely transforming second codes configuring the bit-map data into codes representative of predetermined parameters and for decoding the transformed codes into image data; a second storage means for storing the image data decoded by the second decoding means, block by block; and a synthesizing means for reconfiguring the decoded image for every block of the small bit-map data decoded by the first decoding means, and the decoded image for every block of the multilevel bit-map data stored by the second storage means, for synthesizing image data.

According to further aspect of the present invention, there is provided a method for coding an image including a bit-map of different levels. This method stores and transmits small bit-map data wherein the respective picture elements are expressed by small data regarding resolution as important, and multilevel bit-map data wherein the respective picture elements are expressed by multilevel data regarding tone as important. This method comprises the steps of: inputting the small bit-map data and the multilevel bit-map data, which have been divided into a plurality of blocks, each being composed of a plurality of picture elements; transforming the binary bit-map data of each of the blocks into codes representative of the numbers of substantially black picture elements and substantially white picture elements and grey level picture elements in each of the blocks, with respect to the blocks of the small bit-map data; transforming the multilevel bit-map data of each of the blocks into codes representative of predetermined parameters; and coding the multilevel bit-map data using the common codes.

According to still further aspect of the present invention, there is provided a method for decoding an image including a bit-map of different levels. This method decodes digital data coded by the same codes for storing and transmitting small bit-map data wherein the respective picture elements expressed by binary data regarding resolution as important, and multilevel bit-map data wherein the respective picture elements expressed by multilevel data regarding tone as important. This method comprises: a discrimination step for inputting digital data including small bit-map data and multilevel bit-map data, which are divided into a plurality of blocks, each being composed of a plurality of picture elements, and for discriminating as to whether the codes of the inputted digital data are first codes representative of small bit-map data or second codes representative of multilevel bit-map data; a first storage step for storing the first codes as small bit-map data when the discrimination step discriminates that the codes of the digital data are the first codes; a first decoding step for estimating that the first codes stored in the first storage step are the small bit-map data, and for decoding the small bit-map data by restoring small bit-map data from the estimated first codes; a second decoding step for decoding the second codes as multilevel bit-map data when it is discriminated in the discrimination step that the codes of the digital data are the second codes; a second storage stop for storing the multilevel bit-map data decoded in the second decoding means; and a synthesizing step for synthesizing the small bit-map data decoded in the first decoding step and the multilevel bit-map data stored in the second storage step, as image data.

As mentioned above, according to the present invention, in an image recording system for recording an image including a binary image and a multilevel image, the compression-coding is effectively carried out with respect to multilevel bit-map data as well as binary bit-map data, so that binary and multilevel including bit-map data are stored in an image memory. Therefore, it is possible to reduce the capacity of the image memory to the extent of a conventional image memory for a binary bit-map, and to conspicuously decrease the system cost.

In an error compensating memory, the decoding is temporarily carried out when binary bit-map data are coded, so that only binary bit-map data of a block in which the occurrence of an error is detected are stored. Therefore, the capacity of a memory may be slightly smaller than an image memory, considering the probability of occurrence of errors.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiment, but are for explanation and understanding only.

In the drawings

FIGS. 12(a) and 12(b) are views showing another embodiment of the code assignment in the first preferred embodiment of a coding system according to the present invention;

FIG. 13 is a view showing another embodiment of the code assignment in the second preferred embodiment of a coding system according to the present invention;

FIG. 16 is a view showing examples of combinations of the numbers of the digital values in the block in the preferred embodiment of the present invention;

FIG. 17 is a view showing the code assignment in another preferred embodiment according to the present invention;

FIG. 18 is a block diagram showing a basic concept of a system for coding an image of small-level bit-map data according to the present invention; and FIG. 19 is a block diagram showing a basic concept of a system for decoding an image of small-level bit-map data according to the present invention;

DESCRIPTION OF THE PREFERRED EMBODIMENT

Referring now to the accompanying drawings, the preferred embodiments of a system and a method for coding and/or decoding an image including a bit-map of different values, according to the present invention, will be described below.

First, the preferred embodiment of a system and a method for coding and/or decoding an image including a bit-map of different levels, which is applied to a digital printer, will be described below.

Figure 1:
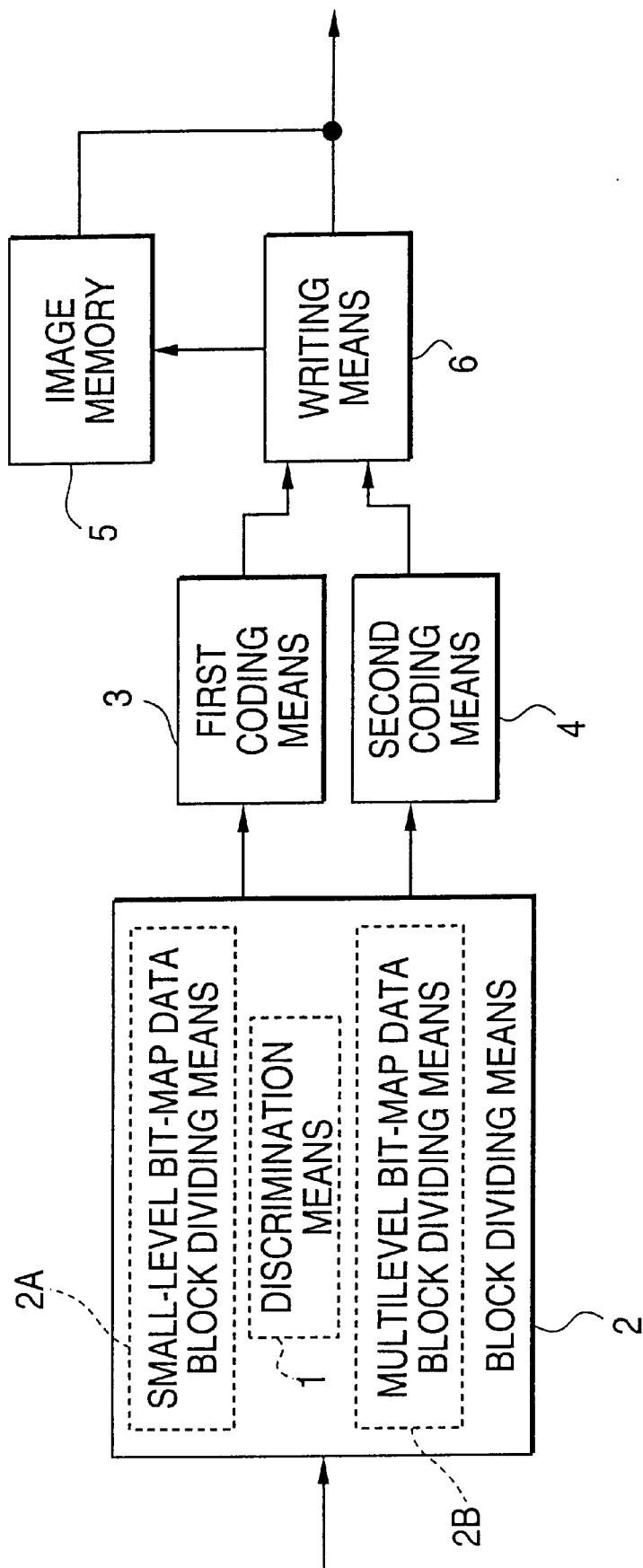
FIG. 1 is a block diagram showing a basic concept of a system for coding an image including a bit-map of different levels, according to the present invention.

FIG. 1 is a block diagram showing a basic concept of a system for coding an image including a bit-map of different levels, according to the present invention. In FIG. 1, the system comprises: dividing means 2 for dividing the image into regions in accordance with the values of bit-map data corresponding thereto, and including discrimination means 1, small-level bit-map data block dividing means 2a and multilevel bit-map data block dividing means 2b; first coding means 3 for coding the blocks of small-level bit-map data; second coding means 4 for coding the blocks of multilevel bit-map data; and a writing means 6 for writing in an image memory 5, the digital data assigned to first and second code-rows of the common codes in accordance with the small-level bit-map data and the multilevel bit-map data. The discrimination means 1 is provided for discriminating the digital value of bit-map data. Accordingly, the coding system basically comprises the block dividing means 2, first coding means 3, second coding means 4, image memory 5 and writing means 6.

The discrimination means 1 discriminates a digital value in the image including the different-level bit-map, and distinguishes the small-level bit-map data from the multilevel bit-map data.

The block dividing means 2 is provided for inputting an image including bit-maps of different levels and for dividing small-level bit-map data and multilevel bit-map data of the inputted image into blocks which configures the inputted image and each of which is composed of a plurality picture elements, the small-level bit-map data and the multilevel bit-map data being inputted through discrimination means 1 for discriminating as to whether the bit-map data of each of the blocks are small-level or multilevel.

The first coding means 3 is provided for transforming image data which configure the blocks of said small-level bit-map data, into codes representative of the numbers of black, white and/or grey level picture elements in the blocks, and for assigning the codes to a first code-row of the common codes of digital data of predetermined bit-number.

Furthermore, the second coding means 4 is provided for transforming image data which configure the blocks of the multilevel bit-map data, into codes representative of predetermined parameters, and for assigning the codes to a second code-row of the common codes of the digital data.

The second coding means 4 transforms image data which are composed of blocks divided by the block dividing means 2B for multilevel bit-map data of the plurality of dividing means, into codes representative of predetermined parameters, and assigns these codes to a second code-row in the common codes of digital data.

The writing means 6 writes the digital data assigned to the first and second code-rows, out of the common codes, in an image memory 5 in accordance with the small-level and multilevel bit-map data.

Figure 2:
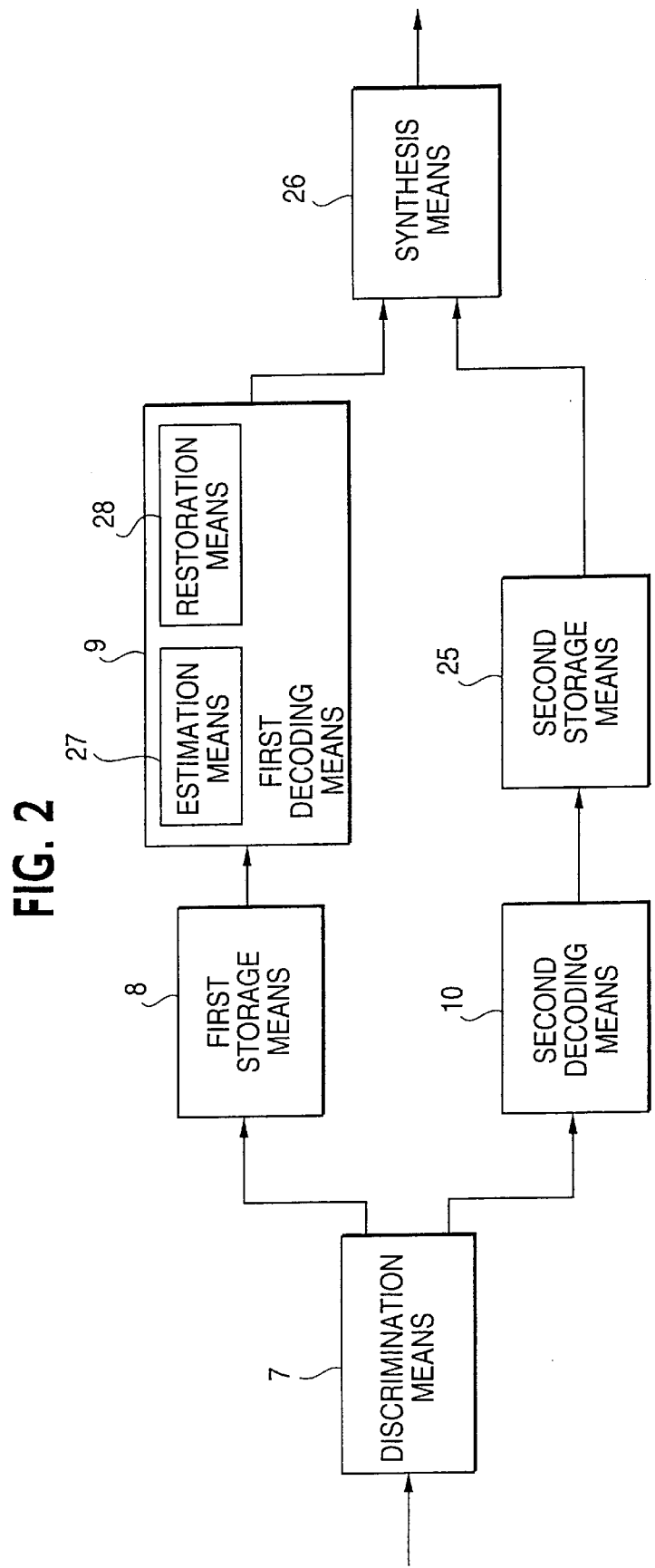
FIG. 2 is a block diagram showing a basic concept of a system for decoding an image including a bit-map of different levels, according to the present invention.

Referring to FIG. 2, the basic concept of a decoding system for an image including a bit-map of different levels, according to the present invention, will be described below.

This decoding system decodes image data coded by a system for coding an image including a bit-map of different levels for expressing a plurality of picture elements by the mixture of the small-level bit-map data regarding resolution as important and the multilevel bit-map data regarding tone as important, and for storing and/or transmitting the image.

In FIG. 2, the decoding system comprises: discrimination means 7 for inputting the code data including different-level bit-map data and for discriminating as to whether the inputted data are small-level bit-map data regarding resolution as important or multilevel bit-map data regarding tone as Important; first storage means 8 for storing small-level bit-map data when the discrimination means 7 discriminates that the inputted data are small-level bit-map data; first decoding means 9 for estimating that the image data stored in the first storage means 8 are bit-map data regarding resolution as important and for restoring the assigned code-row to small-level bit-map data; second decoding means 10 for reversely transforming the second code configuring multilevel bit-map data when the discrimination means 7 discriminates that the inputted data are multilevel bit-map data and for decoding the reversely transformed code into image data; second storage means 25 for storing the image data decoded by the second decoding means 10, for every block; and a synthesis means 26 for reconfiguring the decoded image for each of the blocks of small-level bit-map data decoded by the first decoding means 9, and the decoded image for each of the blocks of multilevel bit-map data stored in the second storage means, to synthesize image data. The first decoding means 9 includes estimation means 27 for estimating that the image data stored in the first storage means 8 are bit-map data regarding resolution as important, and restoration means 28 for restoring small-level bit-map data from the assigned code-row.

Figure 3:
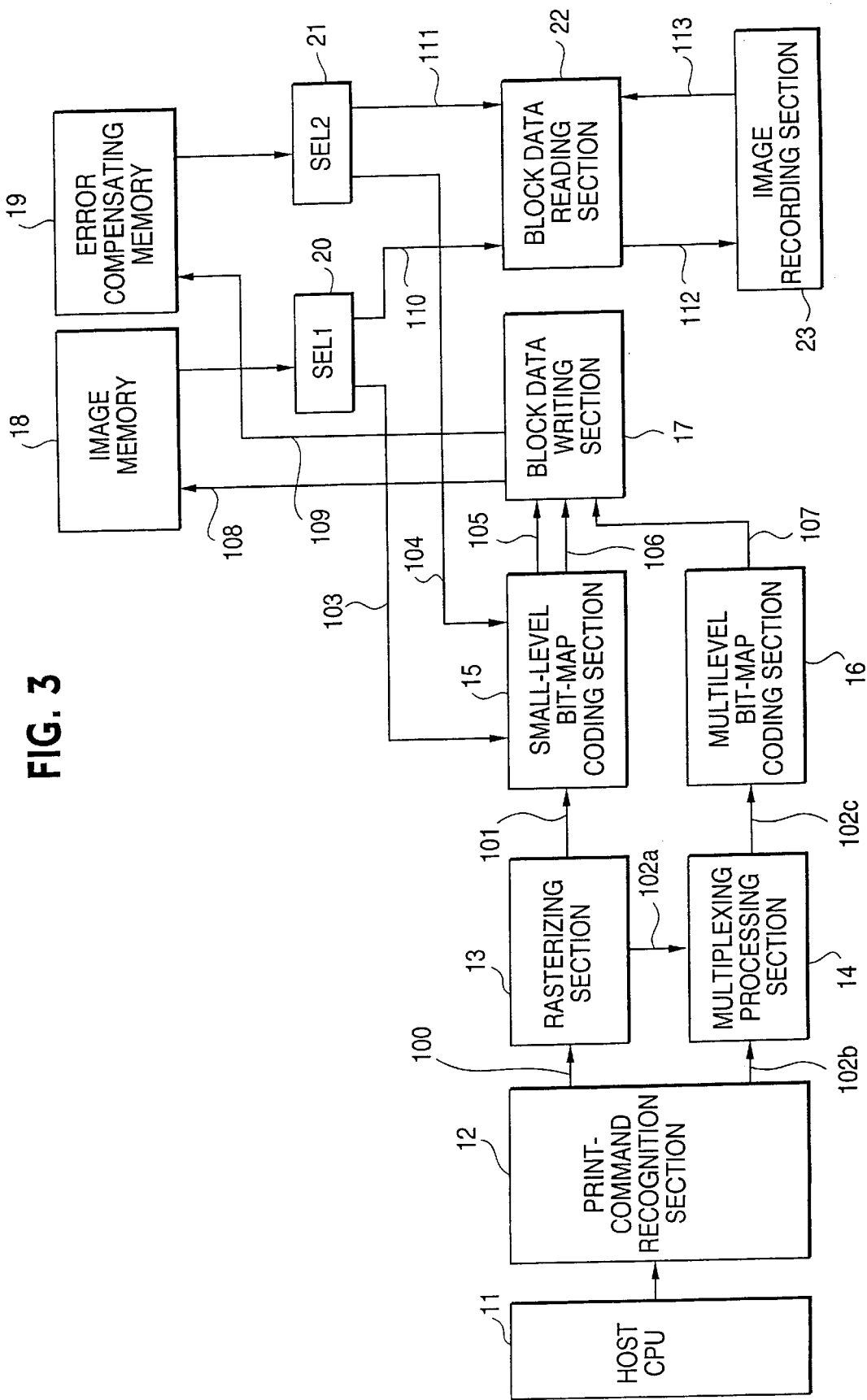
FIG. 3 is a block diagram of the first preferred embodiment of an image recording system, according to the present invention, which is applied to a printer.

Referring to FIG. 3, the first preferred embodiment of a coding and/or decoding system and method for an image including a bit-map of different levels, according to the present invention, will be described below.

FIG. 3 is a block diagram of the first preferred embodiment of an image recording system, according to the present invention. In FIG. 3, the image recording system comprises: a host computer 11 (which will be hereinafter referred to as a "host CPU") for producing a print command; a print-command recognition section 12 for recognizing the print commend: a recognition section 13 for expanding the recognized command into binary bit-map data when the recognized command is a small-level data such as code data and vector diagram note command and for expanding the recognized command into multilevel bit-map data (which will be hereinafter referred to as a "first multilevel bit-map data") when the recognized command is multilevel data regarding tone as important; and a multiplexing processing section 14 for multilevel-processing the first multilevel bit-map data and for multilevel-processing multilevel bit-map data (which will be hereinafter referred to as a "second multilevel bit-map data") when the recognized print command is multilevel bit-map data such as a natural image.

With this construction, the print command produced by the CPU 11 is inputted to the print-command recognition section 12, so that the content of the print-command is recognized. When the print commands recognized by the print-command recognition section 12 are data code representative of characters and signs and/or vector diagram commands for plotting squares and curves, the rasterizing section 13 expands the print commands 100 into binary bit-map data 101 wherein the respective picture elements are expressed by binary data. In addition, when the recognized print-commands are representive of the characters, signs, figures and so forth, the rasterizing section 13 also expands the print commands 100 into the first multilevel bit-map data 102a to supply the expanded print commands to the multiplexing processing 14. Moreover, when the recognized print commands are multilevel bit-map data 102a such as the natural image data, these data 102b are supplied from the print-command recognizing section 12 to the multiplexing processing section 14.

When the multilevel numbers of the first and second multilevel bit-map data 102a and 102b do not correspond to the multilevel number (the tone number) which can be recorded by the image recording section 23 (the level number of the latter is usually greater than that of the former), the multilevel processing section 14 transforms the multilevel bit-map data 102a and 102b into multilevel bit-map data 102a (which will be hereinafter referred to as a "third multilevel bit-map data) which an be recorded by the image recording section 23, by means of a multilevel processing such as the multilevel error diffusion and the multilevel dither. The third multilevel bit-map data 102c outputted from the multilevel processing section 14 are transmitted to the multilevel bit-map coding section 16, and the compression-coding thereof is carried out as will be described later.

The small-level bit-map coding section 15 blocks the small-level bit-map data 101, i.e., divides the small-level bit-sap data 101 into blocks of a plurality of picture elements. The small-level bit-map coding section 15 also assigns binary block data 105 to each of the blocks on the basis of the content of the small-level bit-map data 101 in the corresponding block, of read-out block data 103 supplied from an image memory (a page memory) 18 and of read-out non-compression coding data 104, so that the compression-coding of the data in the corresponding block is carried out. The small-level block data are transmitted to a block-data writing section 17.

Similarly, the multilevel bit-map coding section 16 blocks the third multilevel bit-map data 102c, assigns multilevel block data 107 to each of the blocks for compression-coding, and transmits the multilevel block data 107 to the block-data writing section 17.

The block-data writing section 17 prepares bit-map data 108 (which will be hereinafter referred to as "write block data") for every block after compression-coding which are to be written in the image memory 18, and non-compression coding data 109 (which will be hereinafter referred to as "write non-compression coding data") which are to he written in an error compensating memory 19. As will be described later, in a case where an error occurs when the small-level bit-map data are compression-coded, an error code is assigned to the write block data 108, and the write non-compression coding data 109 are written in the error compensating memory 10

On the other hand, the block data read-out section 22 reads the block data written in the image memory 18, as read-out block data 110 through a first selector 20, in synchronism with an image recording timing signal 113 supplied from the image recording section 23. When the read-out block data 110 has an error code, the block data read-out section 22 reads the non-compression coding data written in the error compensating memory 19, as read-out non-compression coding data 111 through a second selector 21. In addition, the block data read-out section 22 transforms the read-out block data 110 and the read-out non-compression coding data 111 into serial bit data 112 which are transmitted to the image recording section 23.

Furthermore, the first and second selectors 20 and 21 are designed to select as to which of the small-level bit-map data coding section 15 or the block data read-out section 22 reads the contents of the image memory 18 and the error compensating memory 19.

Figure 4:
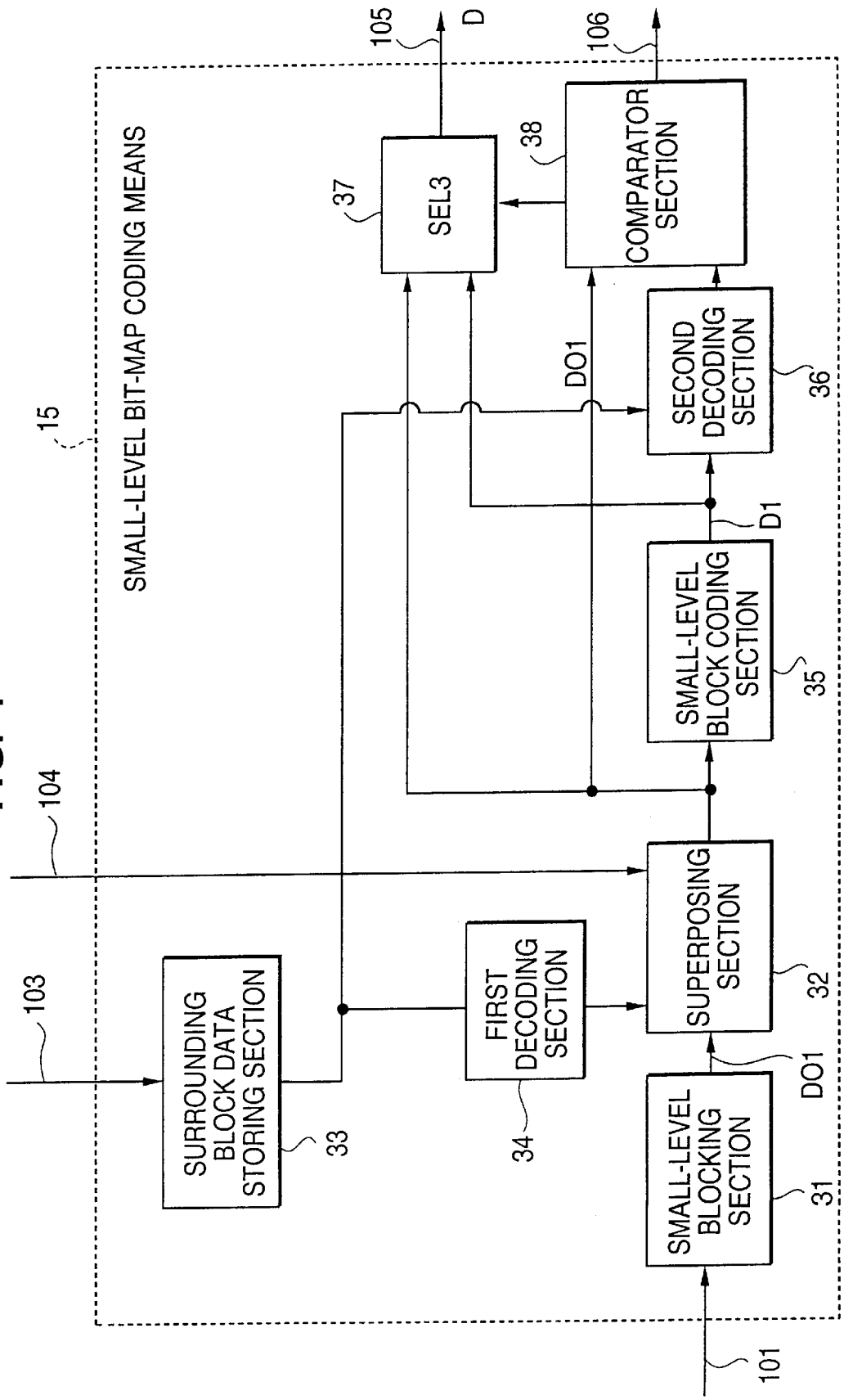
FIG. 4 is a block diagram showing the construction of the small-level bit-map coding section shown in FIG. 3.

Next, each of the sections in the first preferred embodiment of the present invention as shown in FIG. 3 will be described in detail. First, the small-level bit-map coding section 15 will be described. As shown in FIG. 4, the small-level bit-map coding section 15 comprises a smell-level blocking section 31, a superposing section 32, a surrounding block data storing section 33, a first decoding section 34, a small-level block coding section 35 and a second decoding section 36, a third selector 37 and a comparator section 38.

Figure 5B:
FIGS. 5(a) through 5(d) are conceptual views of blocking in the small-level bit-mapping section shown in FIG. 4, FIGS. 6(a) and 6(b) are conceptual views of decoding operations in the first and second decoding sections as shown in FIG. 4.
Figure 5C:
Figure 5D:
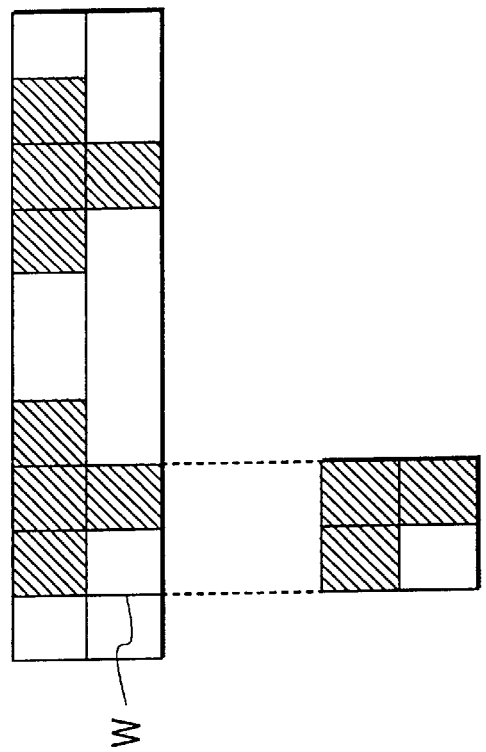
Figure 5A:
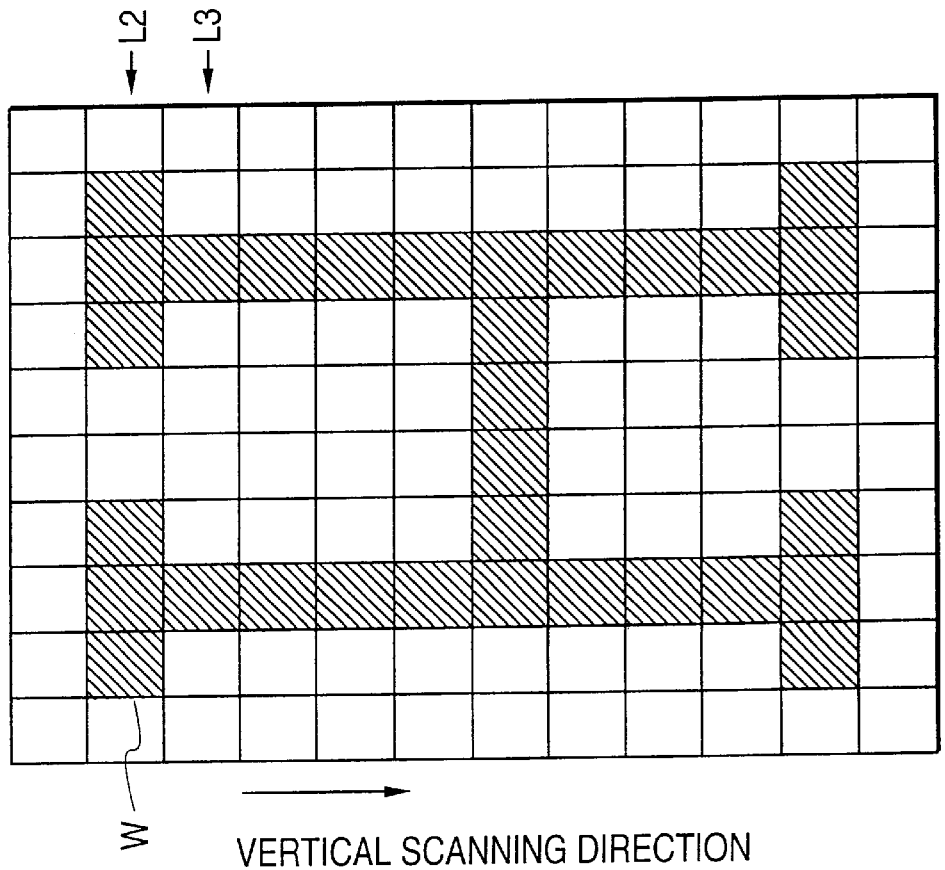

Before the construction as shown in FIG. 4 is explained, referring to FIGS. 5(a) and 5(b), the flow of data in the small-level bit-map coding section 15 will be described. FIG. 5(a) is a view showing small-level bit-cap data 101 inputted to the small-level bit-map coding section 15. In this figure, one of squares indicates a region of a picture element, and small-level data, i.e., 1-bit data, are assigned to each of the picture elements.

The small-level bit-map data 101 correspond to a dot configuring an image which is actually recorded on a recording paper, and "1" and "0" of the 1-bit data in each of the picture elements indicate as to whether a dot is recorded on a recording paper at the position corresponding to the square. For example, in the squares expressed by slanting lines, the data "1" indicates that a dot is formed on the recording paper at the position corresponding to the square. In white squares, the data "0" indicates that no dot is formed on the recording paper at the position corresponding to the square.

The small-level bit-map data 101 are serially inputted to the binary bit-map coding section 15, pixel by pixel along a horizontal scanning line. FIGS. 5(b) and 5(c) show serial data along horizontal scanning lines L2 and L3 which are lines 2 and 3 in FIG. 5(a).

In FIG. 4, the small-level blocking section 31 is composed of line buffers of two lines. The binary blocking section 31 receives serial data of two lines, as shown in FIGS. 5(b) and 5(c), which configures the small-level bit-map data 101. Then, after the small-level blocking section reconfigures these serial data on the line buffers in the form of a page format as shown in FIG. 5(d), it forms a window W having a size of M picture elements in the horizontal scanning direction and N picture elements in the vertical scanning direction. In this example, M=2 and N=2. The small-level blocking section 31 divides the inputted serial data into blocks of four picture elements in the window W, and transmits the bit data of the blocks of four picture elements to the superposing section 32, with the transmitted bit data corresponding to first small-level block bit-map data D01.

The surrounding block data storing section 33 temporarily stores the read-out block data 103 supplied from the image memory 18 of FIG. 3 through the first selector 20, and configures first surrounding block data. The first surrounding block data are composed of a block data group of 3 blocks in the horizontal scanning direction and 3 blocks in the vertical scanning direction, the central block of the block data group being arranged at the position corresponding to the first small-level block bit-map data D01 outputted from the small-level blocking section 31.

The first decoding section 34 decodes the central block as second small-level block bit-map data in a procedure as will be described later, on the basis of the first surrounding block data supplied from the surrounding block data storing section 33. At this time, when the central block is an error code, it is not decoded by the first decoding section 34, and the non-compression coding data 104 are read out of the error compensating memory 19 through the second selector 21 to be inputted to the superposing section 32.

The superposing section 32 superposes the first small-level block bit-map data D01 supplied from the binary blocking section 31, on the second small-level block bit-map data supplied from the first coding section 34, and configures third small-level block bit-map data. In the superposition, for example, when at least one of the same picture elements of the first and second mall-level block bit-map data is a black picture element, the picture elements corresponding to the third small-level block bit-map data are black picture elements.

The small-level block coding section 35 compressively codes the third small-level block bit-map data supplied from the superposing section 32, and outputs the compressively coded data as binary block data D1. This compressive-coding is carried out by assigning a code corresponding to the number of the black picture elements in the third small-level block bit-map data, to the small-level block data of the output of the small-level block coding section 35. That is, it is sufficient for the number of black picture elements which can be arranged in the block, only five codes from "0" to "4" basically in this example, to be assigned to the small-level block data D1. In practical, when the density is "0" or "4", the these codes and the multilevel block data as will be described later are used in common, so that it is sufficient for only three codes to be assigned to the small-level block data D1.

As will be described later, in this preferred embodiment, an error code is assigned to the small-level block data D1, so that the number of the codes assigned to the small-level block data D1 is consequantly "4". Therefore, the small-level block data D1 outputted from the small-level block coding section 35 is conspicuously decreased in comparison with the number of codes 24–16 which are necessary for the bit-map data of two blocks before compression-coding, so that it can be efficiently compressed.

Figure 6A:
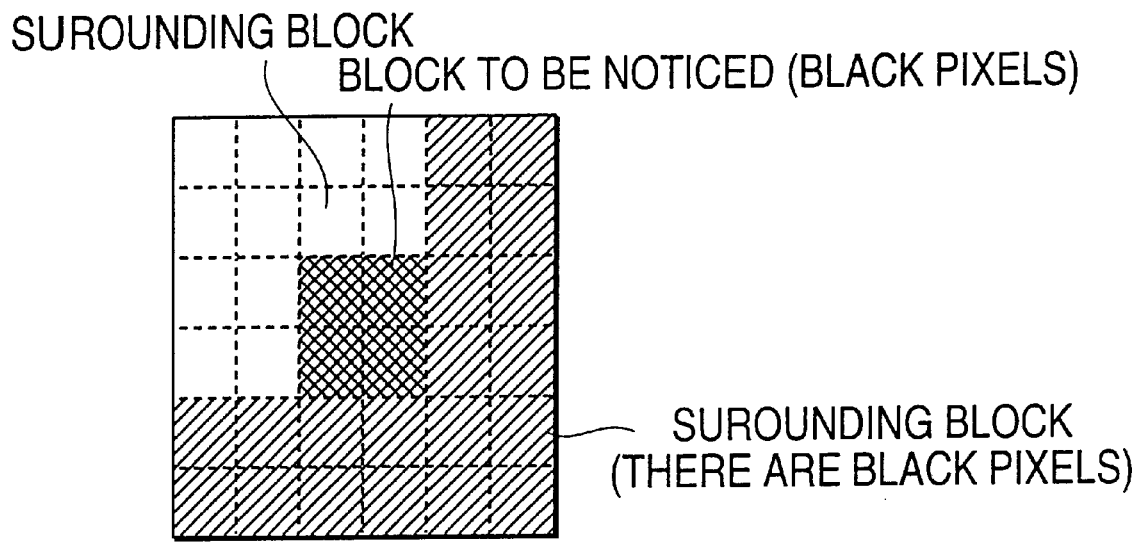
Figure 6B:
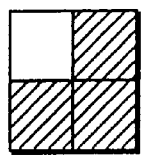

In general, the picture element pattern of a small-level image such as character and figure images is greatly related to the surrounding picture elements. For example, as shown in FIG. 6(a), there are blocks wherein the number of block picture elements is "4" (these blocks will be hereinafter referred to as a "block to be noticed"). In the surrounding blocks in the neighborhood of the block to be noticed, i.e. in the blocks on the right of, on the upper-right of, on the lower-right of, beneath, and only the lower-left of the block to be noticed, there are black picture elements (it is unnecessary to consider the number of black picture elements). When there is no black picture element in the surrounding blocks other than the aforementioned surrounding blocks, the black picture elements in the block to be noticed exist on the upper-right, lower-right and lower-left sides in the block as shown in FIG. 6(b), in almost cases. Therefore, it is sufficient for only the data for the number of black picture elements (density information) to be provided for the block, so that the pattern information (topological information) can be restored on the basis of the density information of the surrounding blocks.

The second decoding section 36 decodes the small-level block data which have been once coded by the small-level block coding section 35, by the same means as that in the first decoding section 34, on the basis of the first surrounding block data supplied from the surrounding block data storing section 33. Then, the second decoding section 36 outputs the decoded small-level block data as decoded small-level block bit-map data Dr. The decoding operation of the second decoding section 36 is provided for confirming as to whether the coding in the small-level block coding section 35 has been correctly carried out, i.e. whether an error has occurred when the coding has been carried out.

The comparator section 38 determines as to whether the decoding in the second decoding section 36 has been correctly carried out, by comparing the decoded small-level block bit-map data Dr supplied from the second decoding section 36 with the first small-level block bit-map data D01 supplied from the superposing section 32 on the basis of the XOR (exclusive OR) of tooth data. The compared result is transmitted to the third selector 37.

The third selector 37 receives the third small-level block bit-map data from the superposing section 32, and the small-level block data from the small-level block coding section 35. When the compared result indicates that the decoding has been correctly carried out in the second decoding section 36, the third selector 37 transmits the small-level block data D1 supplied from the small-level block coding section 35, to the block data writing section 17 in FIG. 3, as the block data 105 (D) as they are. In addition, when the compared result in the comparator section 38 indicates that an error occurs, i.e. that the decoding has not been correctly carried out, an error code is assigned to the small-level block data 105 (D), and the third small-level block bit-map data supplied from the superposing section 32 is transmitted to the block data writing section 17 as the non-compression coding data 106.

Figure 7:
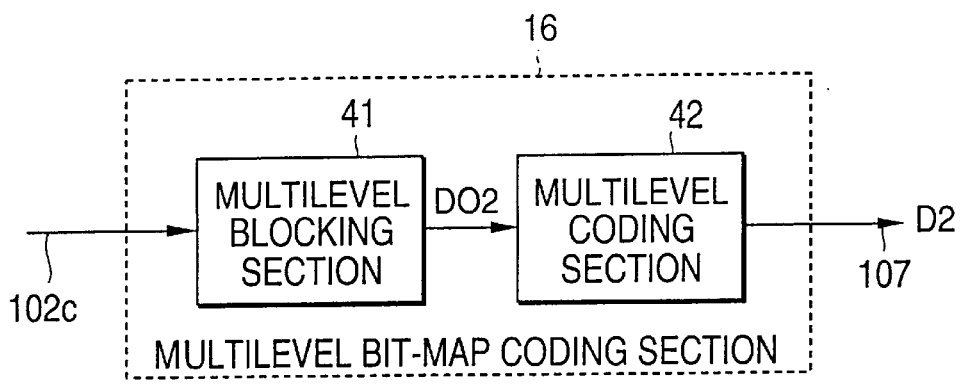
FIG. 7 is a block diagram showing the construction of the multilevel bit-map coding section shown in FIG. 3.

Next, the multilevel bit-map coding section 16 will be described below. As shown in FIG. 7, the multilevel bit-map coding section 16 comprises a multilevel blocking section 41 and a multilevel block coding section 42.

Similar to the small-level blocking section 31 in FIG. 4, the multilevel blocking section 41 divides the multilevel bit-map data 102c supplied from the multiplexing processing section 14, into m picture elements in the horizontal scanning direction and N picture elements in the vertical scanning direction, and configures multilevel block bit-map data D02. The multilevel coding section 42 derives an average or total of the multilevel block bit-map data D02, which are supplied from the multilevel blocking section 41, in the block. The average or total is quantized to be outputted as multilevel block data 107 (D2).

Figure 8:
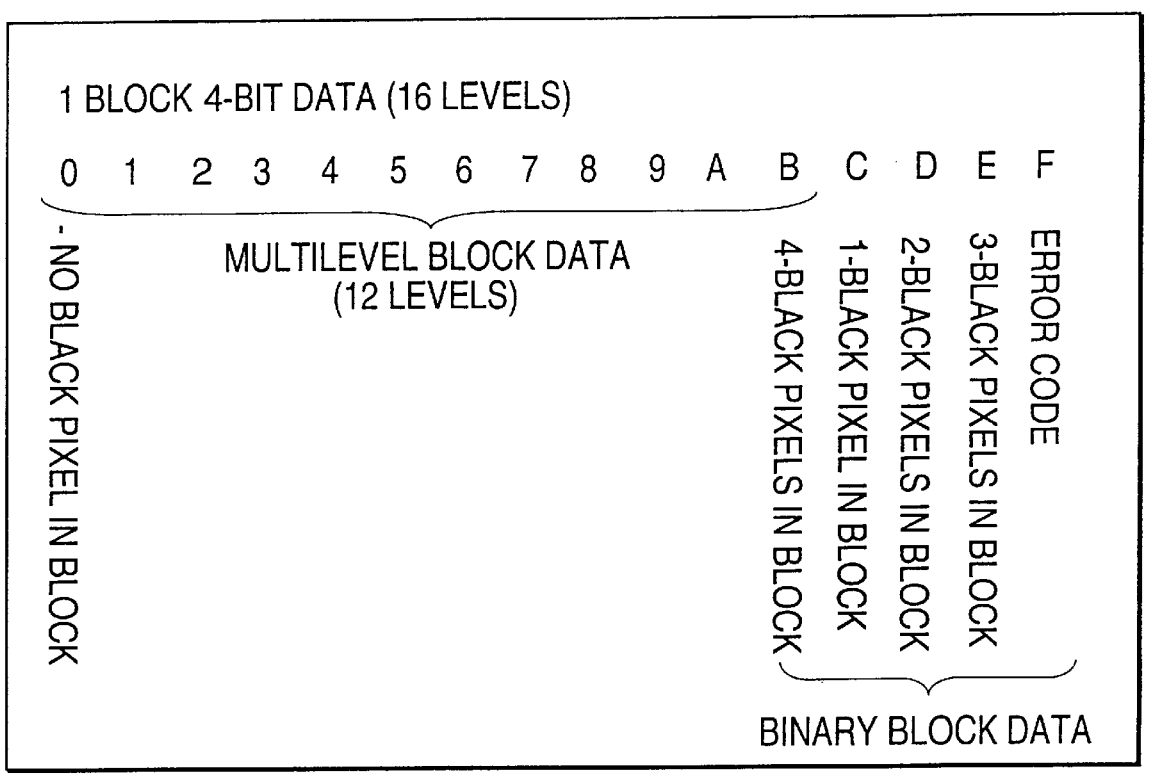
FIG. 8 is a view showing the code assignment in the binary bit-map coding section and the multilevel bit-map coding section shown in FIG. 3.

FIG. 8 shows, when the small-level bit-map data are a binary bit-map data, an example of the code assignment of each of codes to digital data (write block data) 108 assigned to 1 block, assuming that M=N=2, i.e., 1 block includes a square region of 4 picture elements as the total of 2 picture elements in the horizontal scanning direction and 2 picture elements in the vertical scanning direction, and that the digital data 108 has 4 bits (16 values). Since 1 block is formed by 4 picture elements, when a 4-bit memory is assigned to 1 block, the bit-number of the memory per one picture element is 1 bit. Therefore, the capacity of the image memory 18 is substantially the same as that of a memory for storing small-level bit-map data.

That is, in the example of FIG. 8, to the 12-level codes out of 16-level codes of write block data which are composed of 4-bit digital data expressing one block, the multilevel block data 107 (D2) obtained by quantizing the average density in the block into 12-level outputted from the multilevel bit-map coding section 16 is assigned. In addition, the cases that the number of the middle black picture elements of the small-level block data 105 (D) outputted from the small-level bit-map coding section 103 is "1", "2" and "3" are assigned to the 3-level codes of the residual four 16-level codes. To the residual 1-bit code, error codes, i.e., non-compression coding data are assigned.

Moreover, when the number of black picture element in the block of the small-level block data 105 (D) is "0" or "4", the recorded result is substantially the same as that the density of the multilevel block data 107 is 0% or 100%, so that the small-level block data 105 and the multilevel block data 107 have the same code in common. Therefore, it is possible to express multilevel of 12 tones by means of the image memory 18 of 4-bit digital data per one block, i.e., 1-bit per one picture element, that is, by means of the image memory 18 which has the same capacity as that of a page memory for small-level bit-map data.

In the block data writing section 17 in FIG. 3, the small-level block data 105 and the multilevel block data after compression-coding thus code-assigned, are written in the image memory 18 as the write block data 108. In addition, the non-compression coding data 106 is written in the error compensating memory 19 as the write non-compression coding data 109.

Figure 9:
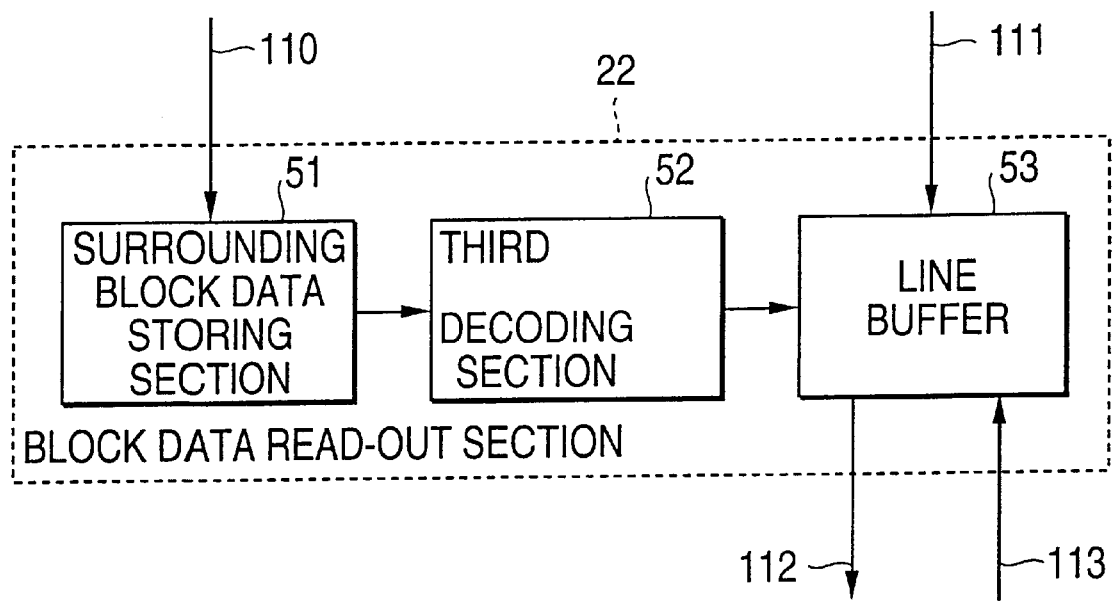
FIG. 9 is a block diagram showing the construction of the block data read-out section as shown in FIG. 3.

Next, the block data read-out section 22 will be described. As shown in FIG. 9, the block data read-out section 22 comprises a surrounding block data storing section 51, a third decoding section 52 and a line buffer 53.

The surrounding block data storing section 51 receives the read-out block data 110 from the image memory 18 through the first selector 20, and configures a surrounding block data group of 3 blocks in the horizontal scanning direction×3 blocks in the vertical scanning direction, the central block of the surrounding block data group being arranged at the decoded block to be noticed.

The third decoding section 52 decodes the data of the block to be noticed, which are to be decoded, as a bit pattern, on the basis of the block data group of 3 blocks×3 blocks supplied from the surrounding block data storing section 51. When an error has been assigned to the block to be noticed, the read-out non-compression coding data 111 corresponding to the block to be notice, are directly read in the line buffer 53 from the error compensating memory 19 through the second selector 21.

The line buffer 53 receives a bit pattern from the third decoding- section to temporarily stores the bit pattern, and transmits the stored bit pattern, pixel by pixel, to the image storing section 23 in the horizontal scanning direction as the serial bit data 112, in synchronism with the image recording timing signal 113 supplied from the image recording section 23.

In the first decoding section 31 in the small-level bit-map coding section 15 as shown in FIG. 4, the second decoding section 36, and the third decoding section 52 in the block data read-out section 22 as shown in FIG. 9, the picture element pattern in the central block is restored in accordance with the surrounding block data group. This decoding is realized by a look-up table using a ROM.

In this case, although the input of the lock-up table has 4-bit data of the block to be noticed, and 32 bits which are the total of 4-bit data of each of 8 blocks surrounding the block to be noticed, only the block to be noticed which has small-level data is decoded. Therefore, when the small-level bit-map data is the binary bit-map data as shown in FIG. 8, it is desired to preprocess the block to be noticed, and to reduce its code number, to the code number of small-level block data, i.e. 2 bits (the number of black picture elements "1", "2" "3" and error code). In addition, since the block to ha noticed can be sufficiently decoded by 1-bit data representative of the presence of a black picture element in a small-level block, 10 bits is sufficient as the total of 2 bits of the data of the block to be noticed and 1 bit of each data of 8 surrounding blocks. Moreover, since the output of the lock-up table is an arrangement pattern as that in the block, 4 bits are required, so that the scale of the look-up table totals 14 bits.

In addition, this look-up table is prepared by analyzing, for example, the picture element pattern of character set to be decoded, to measure the relationship between the presence of the picture element in the surrounding blocks and the picture element pattern of the block to be noticed. Then, the look-up table is prepared so as to select a picture element pattern having the closest relationship with the surrounding blocks and the black picture elements.

Figure 10:
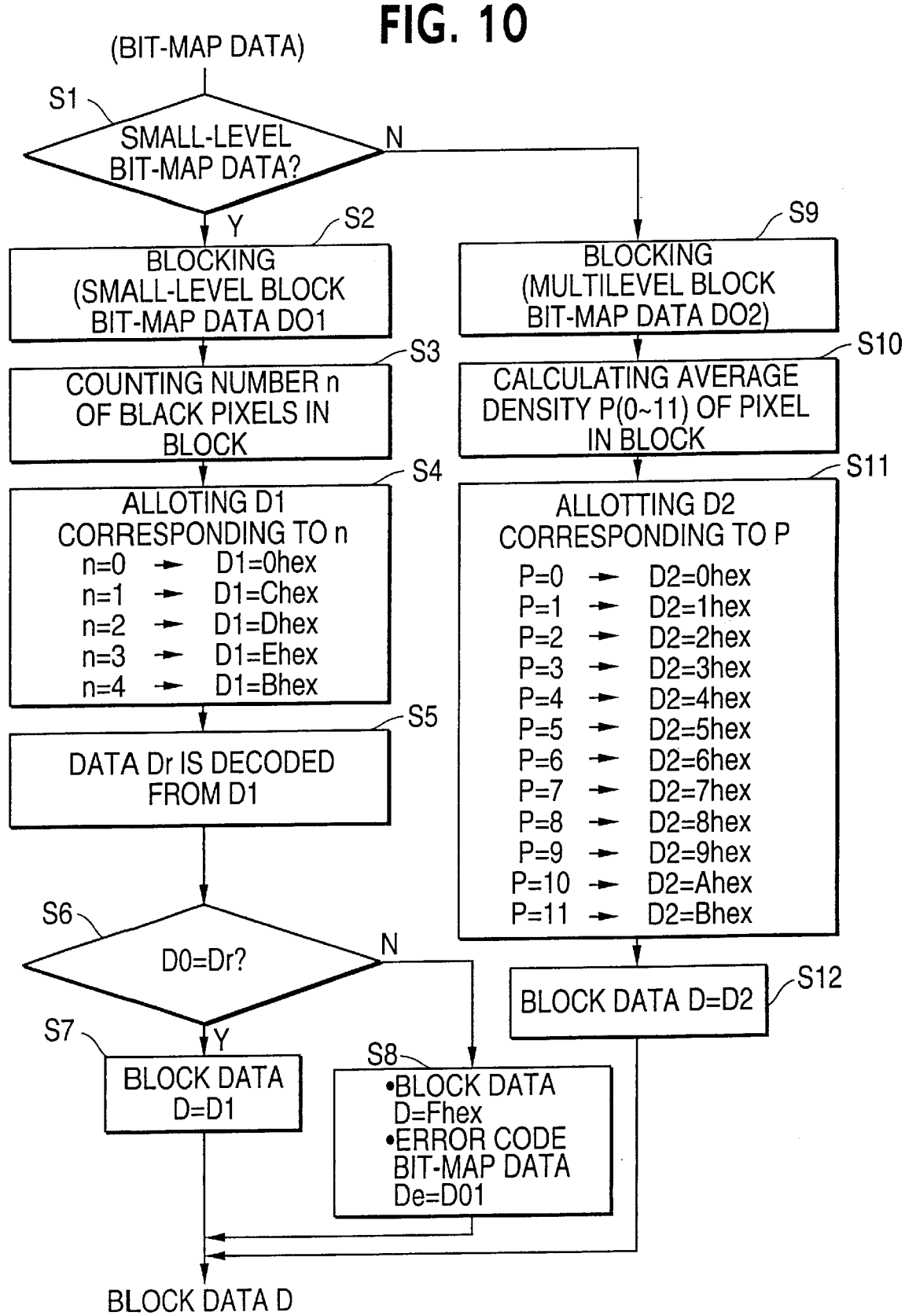
FIG. 10 is a flowchart showing the coding procedure in the small-level bit-map coding section and the multilevel bit-map coding section shown in FIG. 3.

Referring to the flowchart as shown in FIG. 10 when the small-level bit-map data is the binary bit-map data, the procedure of coding in the small-level bit-map coding section 15 and the multilevel bit-map coding section 16 will be described below.

First, it is discriminated as to whether the bit-map data is small-level bit-map data or multilevel bit-map data (Step S1). This discrimination is carried out by means of the print-command discriminating section 12 in the case of FIG. 3. When it is discriminated that the bit-map data is small-level bit-map data, it is blocked by the small-level blocking section 31 so as to be small-level block bit-map data D01 (Step S2).

With respect to this small-level block bit-map data D01, the number n of black picture elements in the block is counted in the small-level block coding section 35 (Step S3). In accordance with the value Ni[di], the small-level block bit-map data D01 is transformed into small-level block data D1 (Step S4).

The small-level block data D1 are temporarily decoded as decoded small-level block bit-map data Dr in the second decoding section 36 (Step S5), to be compared with the small-level block bit-map data D01 by means of the comparator section 38 (Step S6). If the small-level block data D1 correspond to the small-level block bit-map data D01, the small-level block data D1 are selected by means of the third selector 37 to be outputted as block data D (Step S7). on the other hand, if the small-level block data D1 are different from the small-level block bit-map data D01, "F" is assigned to the block data D, and D01 is assigned to the error code bit data De (Step S8).

On the other hand, the bit-map data discriminated as multilevel bit-map data in Step S1 are blocked by means of the multilevel blocking section 41, so as to be multilevel block bit-map data D02 (Step S9). With respect to the multilevel block bit-map data D02, the average density P of the picture elements in the block is derived in the multilevel block coding section 42 (Stop S10), and the multilevel block data D2 are assigned in accordance with P (Step S11). The multilevel block bit-map data D2 are outputted as the block data D as they as (Step S12).

Figure 11:
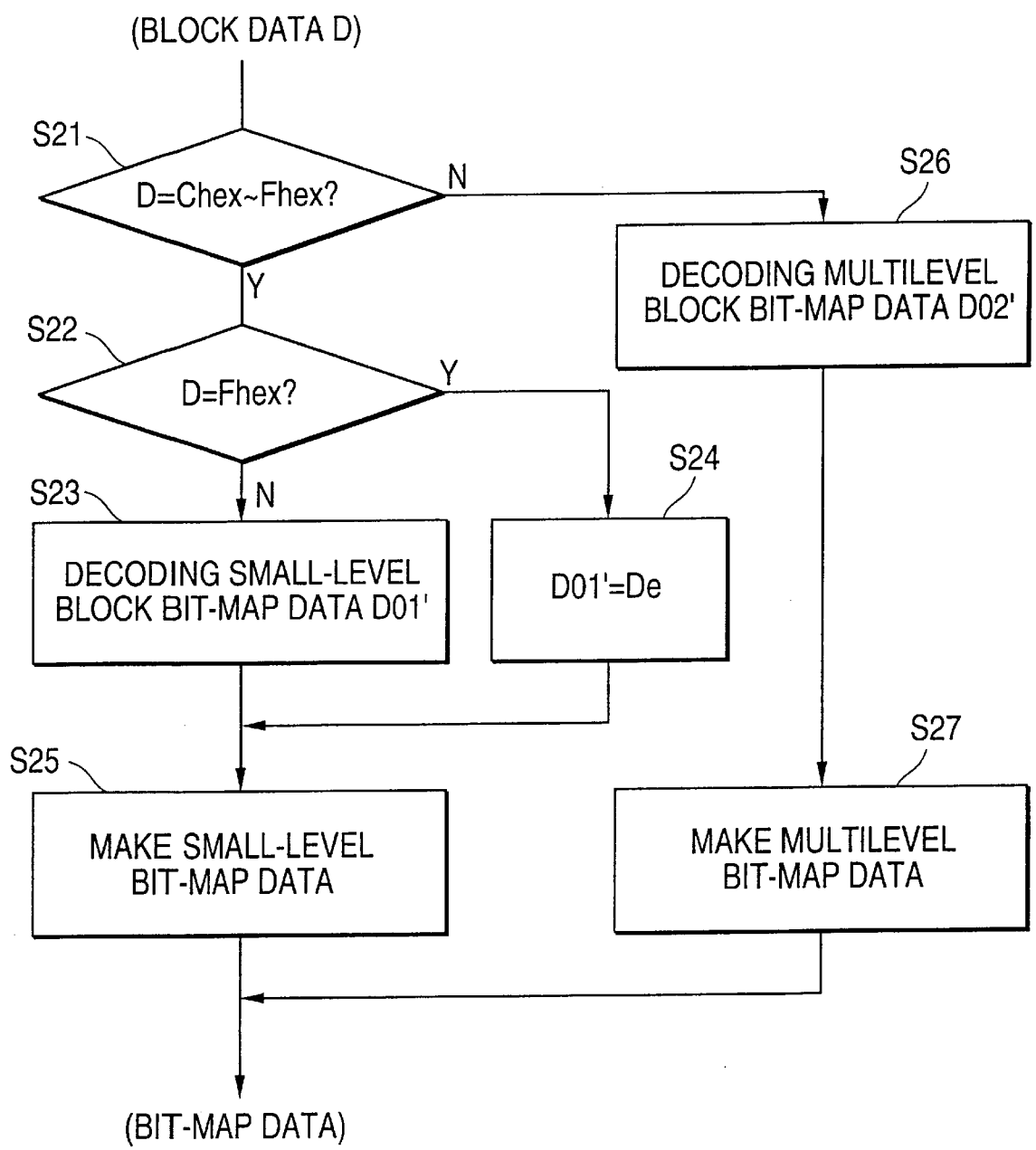
FIG. 11 is a flowchart showing the decoding procedure in the block data read-out section in FIG. 3.

Referring to the flowchart as shown in FIG. 11, the procedure of decoding in the block data read-out section 22 will be described below.

It is discriminated as to whether the block data (the read-out block data) D inputted to the block data read-out section 22 are data representative of small-level block data (D=C~F), or data representative of multilevel block data (D=0~B) (Step S21). When the block data D are representative of small-level block data, it is discriminated as to whether they are error codes (F) (Step S22). When they are not error codes (F), they are decoded as small-level block bit-map data D01' (Step S23).

On the other hand, when the block data D are error codes (F), the error code bit-map data De are the small-level block bit-map data D01' read out of the error compensating memory 19 (Step S24). In addition, the small-level blocks are returned to the format for every page (Step S25), to be bit-map data.

On the other hand, when it is determined in Step S21 that the block data D are stand as the block data, the block data D are decoded as the multilevel bit-map data D02' (Stop S26), to be multilevel bit-map data (Step S27).

The bit-map data thus decoded are transmitted to the image recording section 23 to be recorded.

Figure 12A:
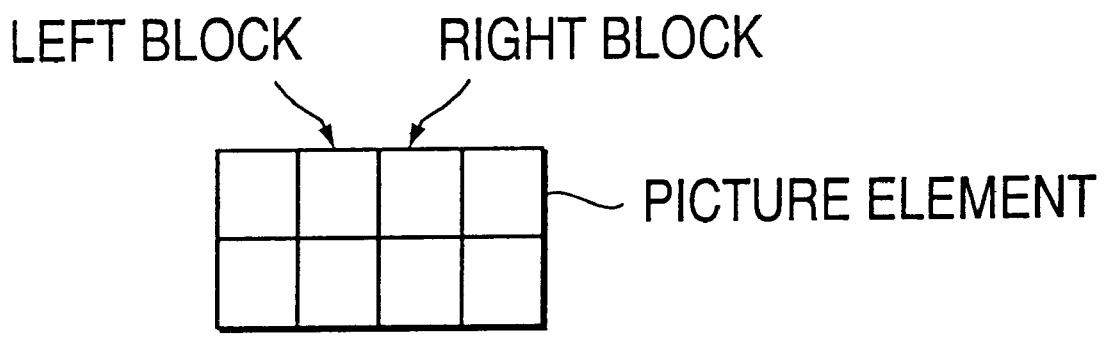

FIGS. 12(a) and 12(b) show the preferred embodiment in which the block size is increased when the small-level bit-map data is the binaru bit-map data. In this preferred embodiment, assuming that M=2, N=2, i.e. one block is composed of 4 picture elements in the horizontal scanning direction and 2 picture elements in the vertical scanning direction, a code is assigned to this block. As shown in FIG. 12(a), this block is divided into two parts in the horizontal scanning direction. Assuming that the right half is a right block and the left half is a left block, code are assigned to them as shown in FIG. 12(b). When at least one of the left block and the right block is a small-level block, the other block is assumed as a small-level block if the other block is a multilevel block. At this time, it is necessary for the tone data of the original multilevel blocks 0 through 13 to be transformed into the black picture elements number data 0 through 8 corresponding to the codes of the small-level blocks. Therefore, different code of blocks can not be assigned to the right and left blocks such that the right block is a small-level block and the left block is a multilevel block.

In this way, unless one block is composed of two picture elements in the horizontal scanning direction and two picture elements in the vertical scanning direction, the small-level block can increase the resolution in the horizontal scanning direction by two times by substantially the same capacity as small-level memory, and the multilevel block can express greater tone number. As mentioned above, as the block size increases, the small-level block can increase the resolution and the multilevel block increase the tone number.

Furthermore, in FIG. 12, when an error code is assigned to any one of the right block and the left block in the case of small-level block, the whole block is assumed as an error code block. However, the code assigned to the small-level block may be increased, and the error code may separately assigned to the right block and the left block as shown in FIG. 13. In this case, although the capacity of the image memory is slightly increased, the rate of coding of the error code can be restrained.

Figure 14:
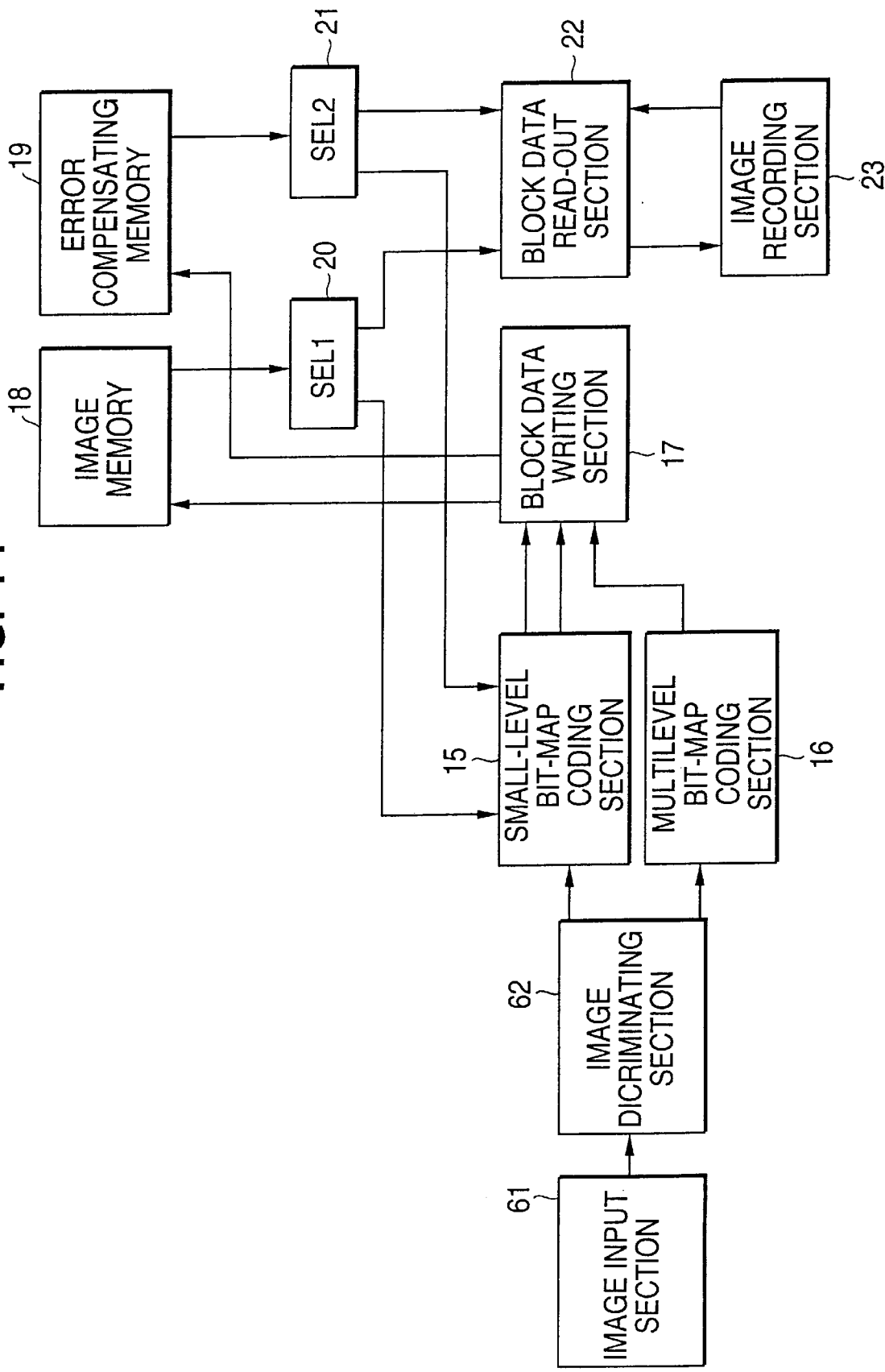
FIG. 14 is a block diagram of the second preferred embodiment of an image recording system, according to the present invention, which is applied to a facsimile system or a digital copying machine.

FIG. 14 shows the second preferred embodiment of an image recording system, according to the present invention, which is applied to a facsimile system and a digital copying machine.

An image input section 61 is, for example, a scanner for reading an Image on a manuscript, and outputs image data in the bit-map form. In general, image data include small-level bit-map data such as character image and figure image regarding resolution as important, and multilevel bit-map data such as a photographic image and other natural images regarding tone as important.

An image discriminating section 62 discriminates as to whether the type of the image, i.e. the small-level bit-map data, are multilevel bit-map data by a well-known image area discriminating processing, and outputs them separately.

When it is discriminated in the image discriminating section 62 that the data are small-level bit-map data, the small-level-processing of the data is carried out by means of the small-level bit-map coding section 15. The small-level bit-map data obtained by the small-level-processing, and the multilevel bit-map data supplied from the image discriminating section 62 are transmitted to the block data writing section 17. Since the subsequent processing is the same as the aforementioned preferred embodiment which is a printer, the explanation thereof is omitted.

In the preferred embodiments as mentioned above, characters, figures and so forth were treated as a small-level image, a photographic image and other natural images. However, according to the present invention, by increasing the code amount assigned to the block, it is possible to efficiently and widely carry out the compression-processing of an image without the need of the limitation of small-level or multilevel.

Figure 15:
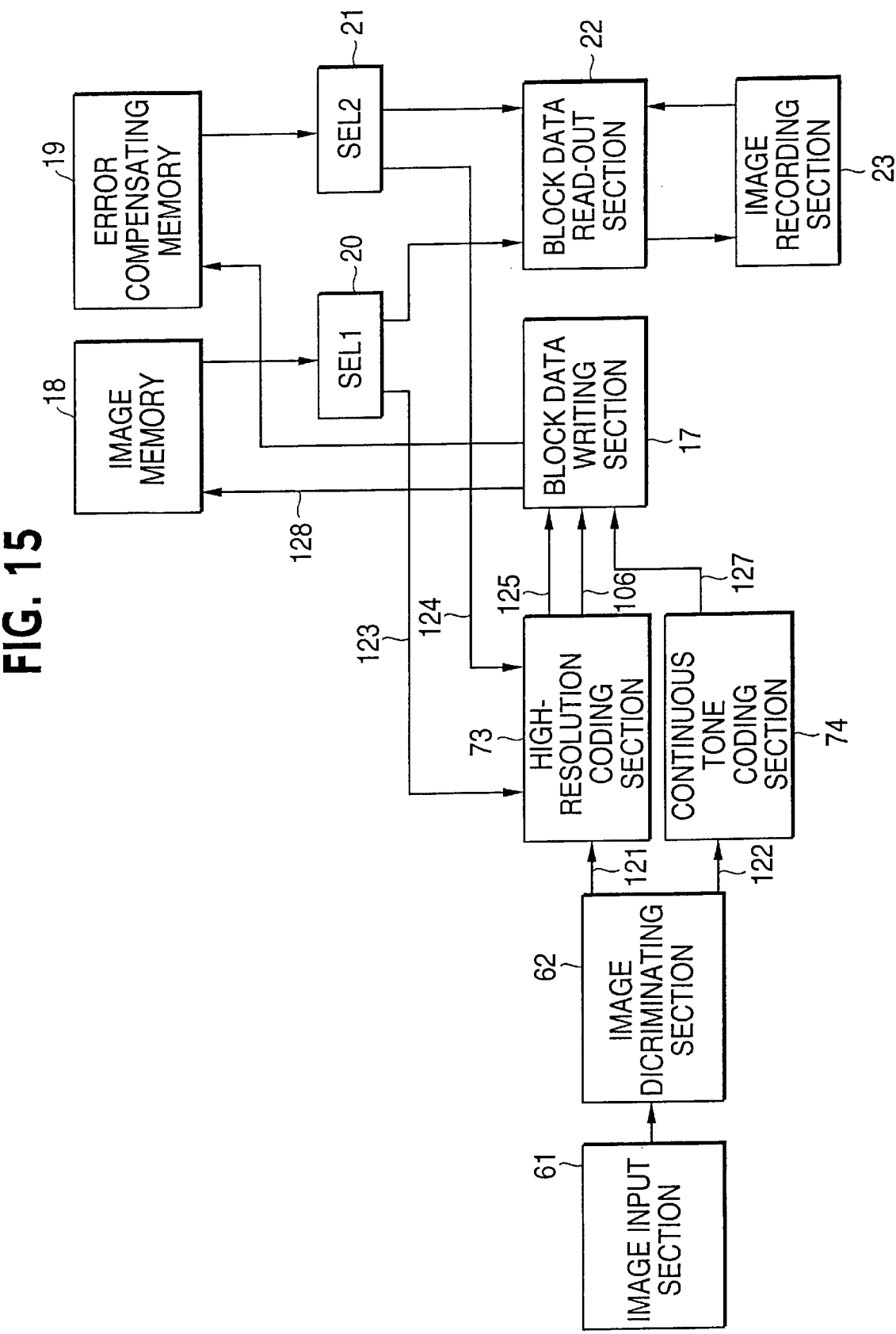
FIG. 15 is a block diagram of the third preferred embodiment of an image recording system, according to the present invention, which is applied to a facsimile system or a digital copying machine.

FIG. 15 shows another preferred embodiment of an image recording system, according to the present invention, which is applied to a digital copying machine which can record multilevel.

An image input section 71 is, for example, a scanner for reading an image on a manuscript, and outputs image data in a bit-map form. The image data include high-resolution bit-map data such as a character image and a figure image which regard resolution as important, and continuous tone bit-map data such as a photographic image and other natural images which regard tone as important. These inclusion bit-map data are inputted to an image discriminating section 72.

The image discriminating section 72 discriminates as to whether the data are high-resolution bit-map data 121 or continuous tone bit-map data 122 by a well-known image area discriminating processing, and outputs them separately.

When it is discriminated in the image discriminating section 72 that the data are high-resolution bit-map data, the data are divided into blocks of a plurality of picture elements by means of a high-resolution coding section 73. Then, the compression-processing is carried out by assigning high-resolution block data 125 to the block is accordance with the contents of the high-resolution bit-map data 121 in the block, read-out block data 123 supplied from the image memory 18, and read-out non-compression coding data 124, and the high-resolution block data 125 are transmitted to the block data writing section 17.

A continuous tone coding section 74 blocks the high continuous tone bit-map data 122, and the compression-processing is carried out by assigning continuous tone block data 127 to each of the blocks. The resulting continuous tones block data 127 are transmitted to the block data writing section 17.

Next, the codings in the high-resolution coding section 73 and the continuous tone coding section 74 will be described. Assuming that one block is a square region composed of four picture elements of two picture elements in the horizontal scanning direction and two picture elements in the vertical direction, the number of the combination of patterns is fifteen as shown in FIG. 16 except for the arrangement information of 3-level (black, white, middle values). In the high-resolution coding section 73, the high-resolution coding section 73 and the continuous tone coding section 74, for example, when one block is composed of four picture elements and when the write block data 128 assigned to one block are five bits (32 levels), the coding is carried out in accordance with the code assignment as shown in FIG. 17. Except that the small-level bit-map data are high-resolution bit-map data and the multilevel bit-map data are continuous tone bit-map data, the subsequent processing are the same as those in the first and second preferred embodiments, so that the explanations thereof are omitted. According to this preferred embodiment, it is possible to code a multilevel high-resolution and high-tone including image by slightly changing the assignment amount of code.

Furthermore, in the first and third preferred embodiments, using mall-level bit-map data and multilevel bit-map data as examples, technique for compressing image data by estimating the density of a picture element to be noticed, by means of the information of the surrounding picture elements, has been described. However, according to the present invention, it is possible to compress an image including only small-level bit-map data, not different-level bit-map data, by means of the information of the surrounding picture elements.

That is, FIGS. 18 and 19 show schematic constructions of coding and decoding systems for small-level bit-map image, respectively.

This coding system for small-level bit-map image is designed to code small-level bit-map data regarding resolution as important for storing and transmitting. As shown in FIG. 18, this coding system for small-level bit-map image basically comprises a block dividing means 2, a density-value coding means 3, an image memory 5, and a writting means 6. The block dividing means 2 divides an inputted image into a plurality of blocks, each of which is composed of small-level bit-map data, and outputs the divided blocks. With respect to each of the plurality of blocks divided by the block dividing means 2, the density-value coding means 3 codes the number of picture elements having a density value in each of the blocks, the density value being a density value of each of the picture elements configuring each of the blocks.

The writting means 6 writes the coded number of the picture elements in the block with respect to the density value of each of the picture elements, in the image memory 5. Furthermore, similar to the first preferred embodiment, when the block dividing means 2 has a discrimination means for discriminating as to whether the bit-map data of the inputted image are small-level or multilevel, the multilevel bit-map data nay be assigned to a second code-row by means of a second coding means 4 as expressed to by a blocken line.

In addition, the small-level bit-map image decoding system is designed to decode image data coded by a small-level bit-map image coding system which code an image including small-level bit-map data regarding resolution as important for storing and/or transmitting. As shown in FIG. 19, the small-level bit-map image decoding system basically comprises a surrounding block storing means 8 and a decoding means 9. The surrounding block storing means 8 inputs code date of an image including small-level bit-map data to store the code information of the block and to the code information of the surrounding blocks. In addition, the decoding means 9 estimates the density information of each of the picture elements in a block on the basis of the codes of the surrounding blocks stored in the surrounding block storing means 8, and restores the density value of the block on the basis of the estimated density information.

This decoding system can be also used for coding and decoding a different-level bit-map including image, by providing a discrimination means 7 for discriminating as to whether the inputted image data are small-level bit-map data or multilevel bit-map data, upstream of the storing means 8, and by providing a second decoding/storing means 10 for decoding the block of multilevel bit-map data from a second code corresponding to a predetermined parameter, and a synthesizing means 26 for forming a reproduced image by synthesizing the decoded small-level and multilevel bit-map data.

What is claimed is:

1. A system for recording image data, comprising:

block dividing means for dividing a bitmap image which is composed of picture elements into blocks including a plurality of said picture elements;

first discrimination means for discriminating as to whether each of said blocks is a block of small-level where resolution information is important or a block of multilevel where tone information is important;

first coding means for transforming said block of small-level into a first code-row representative of only a number of black or half-tone picture elements in said block of small-level;

wherein said first coding means includes local decoding means for decoding codes respective of said number of black or half-tone picture elements in which a block of small-level vary in each of the blocks, and comparing means for comparing the decoded data obtained by said local decoding means with the small-level of a corresponding block and for discriminating as to whether both of the data coincide with each other; and second coding means for transforming said block of multilevel into a second code-row representative of an average density of said picture elements in the block;

assigning means for assigning said first code-row and said second code-row to respective codes positioned in accordance with a rule of common codes;

wherein said assigning means further assigns an error to a third code-row of the commor codes of said digital data, when the comparing means discriminates that said decoded data do not coincide with the small-level of the corresponding block storing means for storing said common codes;

second discrimination means for reading said common codes stored in said storing means and for discriminating as to whether code data in said common codes belong to said first code-row or said second code row;

first decoding means for restoring bitmap data of said block of small-level from surrounding blocks in said common codes information and/or bitmap data information;

second decoding means for reversely transforming the code representing multiple bit-map data data ir to multiple bit-map data; and recording means for recording decoded bit-map data by said first decoding means and said second decoding means.

2. A system for recording image data, comprising:

a block divider configured to divide a bitmap image composed of picture elements into blocks including a plurality of said picture elements;

a first discriminator configured to discriminate as to whether each of said blocks is a block of small-level where resolution information is important or a block of multilevel where tone information is important;

a first coding part configured to transform said block of small-level into a first code-row representative of only a number of black or half-tone picture elements in said block of small-level;

wherein said first coding part includes local decoding means for decoding codes respective of said number of black or half-tone picture elements in which a block of small-level vary in each of the blocks, and comparing means for comparing the decoded data obtained by said local decoding means with the small-level of a corresponding block and for discriminating as to whether both of the data coincide with each other; and a second coding part configured to transform said block of multilevel into a second code-row representative of an average density of said picture elements in the block;

an assigner configured to assign said first code-row and said second code-row to respective codes positioned in accordance with a rule of common codes;

wherein said assignor further assigns an error to a third code-row of the common codes of said digital data, when the comparing means discriminates that said decoded data do not coincide with the small-level of the corresponding block a storing part configured to store said common codes;

a second discriminator configured to read said common codes stored in said storing part, and configured to discriminate as to whether code data in said common codes belong to said first code-row or said second code row;

a first decoding part configured to restore bitmap data of said block of small-level from surrounding blocks in said common codes information and/or bitmap data information;

a second decoding part configured to reversely transform the code representing multiple bit-map data into multiple bit-map data; and a recording part configured to record decoded bit-map data by said first decoding means and said second decoding means.

3. A method for recording image data, comprising:

a first step of dividing a bitmap image which is composed of picture elements into blocks including a plurality of said picture elements;

a second step of discriminating as to whether each of said blocks is a block of small-level where resolution information is important or a block of multilevel where tone information is important;

a third step of transforming said block of small-level into a first code-row representative bf only a number of black or half-tone picture elements in said block of small-level;

a fourth step of transforming said block of multilevel into a second code-row representative of an average density of said picture elements in the block;

wherein said fourth step further comprises the steps of:
      comparing the decoded data obtained by decoding the code transformed by said third step, with the small-level of the corresponding block;
      assigning the code to said first code-rows of the common codes of digital data of the predetermined bit-number when both of the data coincide with each other; and assigning an error code representative of the occurrence of an error to third code-rows of the common codes of said digital data when both of the data do not coincide with each other, thereby storing said small-level;

a fifth step of assigning said first code-row and said second code-row to respective codes positioned in accordance with a rule of common codes;

a sixth step of storing said common codes;

a seventh step of reading said common codes stored in said sixth step;

an eight step of discriminating as to whether code data in said common codes belong to said first code-row or said second code row;

a ninth step of restoring bitmap data of said block of small-level by decoding from surrounding blocks in said common codes information and/or bitmap data information;

a tenth step of reversely transforming the code representing multiple bit-map data into multiple bit-map data; and an eleventh step of recording decoded bit-map data in said ninth step and said tenth step.

* * * * *